United States Patent [19]
Baron et al.

[11] Patent Number: 5,114,047
[45] Date of Patent: May 19, 1992

[54] PUMP AND MIXING DEVICE FOR LIQUIDS

[75] Inventors: Richard D. Baron, Zephyrhills; Malcolm C. Smith, Dade City; Carl R. Spoeth, Bayonet Point; Valdemiro M. Quadros, Zephyrhills, all of Fla.

[73] Assignee: Lykes Pasco Inc., Dade City, Fla.

[21] Appl. No.: 567,186

[22] Filed: Aug. 14, 1990

[51] Int. Cl.$^5$ .................. B65D 37/00; B67D 5/56
[52] U.S. Cl. .................. 222/129.1; 222/207; 222/212; 222/214; 222/333
[58] Field of Search .................. 222/129.1–129.4, 222/207, 209, 212, 213, 214, 333, 478, 491, 494–496, 547, 564

[56] References Cited
U.S. PATENT DOCUMENTS

| | | | |
|---|---|---|---|
| 2,554,570 | 5/1951 | Harvey | 222/214 X |
| 2,685,985 | 8/1954 | Howell | 222/134 |
| 2,702,147 | 2/1955 | Brown | 272/207 |
| 2,716,507 | 8/1955 | Graves | 222/129.2 |
| 2,772,817 | 12/1956 | Jauch | 222/207 |
| 3,828,985 | 8/1974 | Schindler | 222/207 |
| 4,088,298 | 5/1978 | Blake | 222/207 |
| 4,155,487 | 5/1979 | Blake | 222/214 X |
| 4,334,640 | 6/1982 | van Overbruggen et al. | 222/207 |
| 4,393,982 | 7/1983 | Kuckens | 222/214 X |
| 4,646,945 | 3/1987 | Steinen et al. | 222/207 |
| 4,776,495 | 10/1983 | Vignet | 222/207 |
| 4,779,761 | 10/1988 | Rudick et al. | 222/129.2 X |
| 4,953,754 | 9/1990 | Credle, Jr. | 222/129.2 |

*Primary Examiner*—Kevin P. Shaver
*Attorney, Agent, or Firm*—Frijouf, Rust & Pyle

[57] ABSTRACT

A pump and mixing device for pumping a liquid from a container and mixing with a diluent. The pump and mixing device comprises a body member having an input body portion and an output body portion with a flexible wall defining a pumping chamber between the input body portion and the output body portion. The input body portion has an input aperture for enabling the liquid to flow from the container into the input body portion. The output body portion has an output aperture communicating with the flowing diluent. An input one-way valve is disposed in the input aperture for permitting the flow of liquid only from the container to the pumping chamber whereas an output one-way valve is disposed in the output aperture for permitting the flow of liquid only from the pumping chamber. A motive device reciprocates the output body portion relative to the input body portion between a first and a second position for causing liquid to flow from the container through the input one-way valve into the pumping chamber when the output body portion is moved into the first position and for causing liquid to flow from the pumping chamber through the output one-way valve to mix with the diluent when the output body portion is moved into the second position.

33 Claims, 11 Drawing Sheets

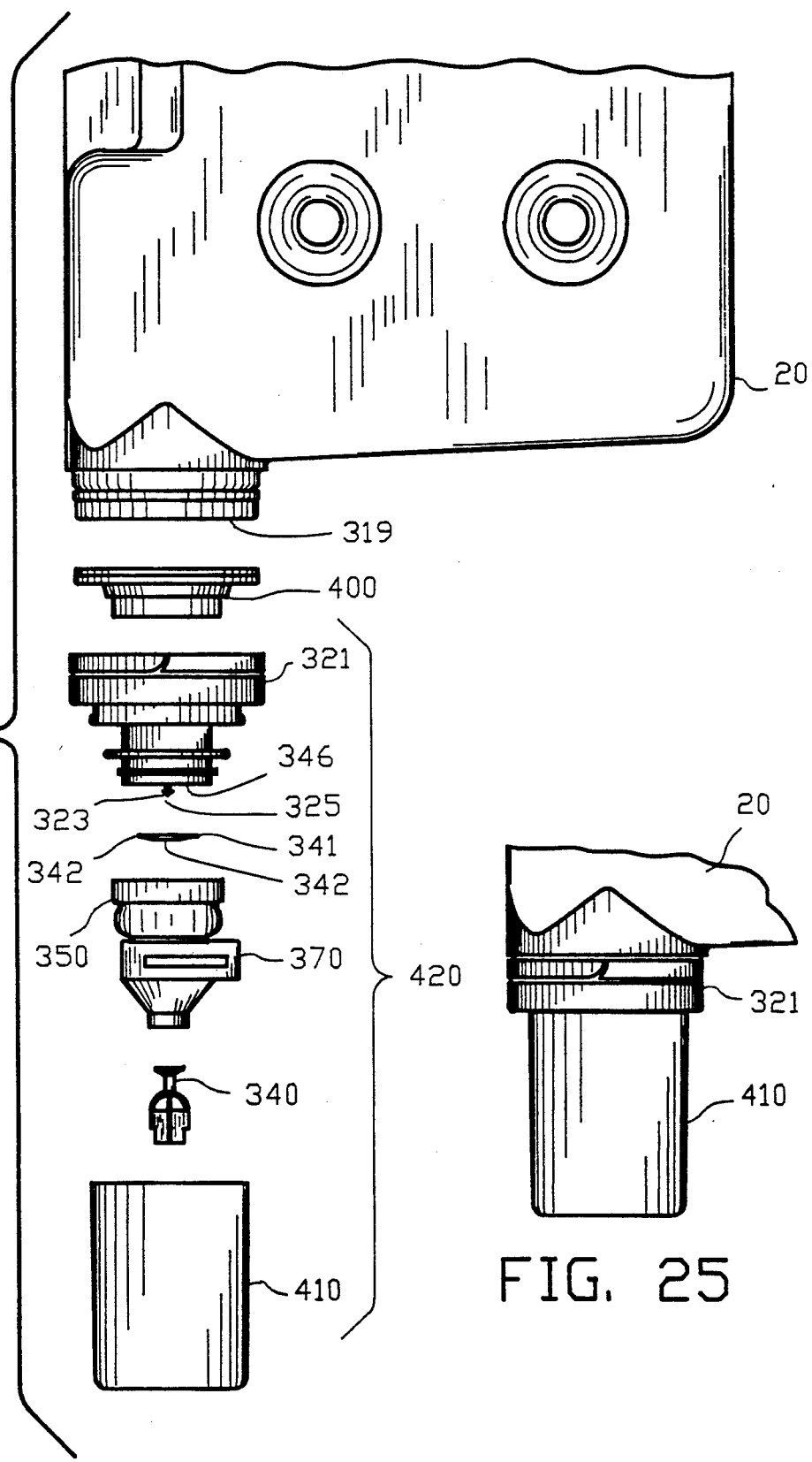

PUMP AND MIXING DEVICE FOR LIQUIDS

BACKGROUND OF THE INVENTION

1. Field of the Invention

This invention relates to a pump for dispensing a liquid from a terminal orifice. More particularly, the invention relates to a pump and a mixer for mixing a liquid concentrate and a liquid diluent for discharge from a terminal orifice.

2. Information Disclosure Statement

The prior art has known many types of pumping systems for pumping and dispensing a single or a plurality of liquids from a terminal orifice. Many of these devices relate to a system for mixing a liquid concentrate with a liquid concentrate in accordance with a pre-determined relationship and then dispensing the mixture from a terminal orifice. One important application for such a mixing and dispensing device is in the dispensing of liquid food products such as fruit juices, vegetable juices and the like. In many cases, fruit and vegetable juices such as orange juice, pineapple juice, grapefruit juice or tomato juice is stored in a frozen concentrate form for use at a later time. The frozen concentrate is then thawed and mixed with a water diluent to produce an end product equivalent to the original fruit or vegetable juice. In order to produce an end product which is equivalent in flavor and in consistency to the original fruit or vegetable juice, the concentrate and the water diluent must be accurately mixed in a predetermined volumetric relationship. Accordingly, the devices for mixing a liquid concentrate with a liquid concentrate must be accurate and reliable to produce an end product equivalent to the original fruit or vegetable juice.

When dealing with food products, other design problems are encountered when designing a pumping and a mixing device for a food dispensing device. First, the pumping and a mixing device must be readily accessible for cleaning the internal portions of the pump after each use. Second, the pump must be designed to pump accurate volumes of concentrate independent of the viscosity of the concentrate. It has been found that frozen orange juice concentrate has different viscosities depending upon the temperature of the frozen orange juice concentrate, the time of harvest of the crop and well as the specific type of orange juice harvested during the relatively long citrus harvesting season. As a consequence of these requirements, peristaltic pumps were popular choice in the prior art for pumping a liquid food concentrate. Peristaltic pumps not only performed well but were simple and low cost. However, the peristaltic pumps had the distinct disadvantage of a relatively large physical size and well as a limited variation in flow rate. Consequently, the flow rate of the liquid diluent had to be controlled in order to obtain different concentrate-diluent ratios for various fruit and vegetable juices. Further disadvantages of the peristaltic pump include a pulsating liquid flow, a noisy operation and a limited life of a deformable tubing in the peristaltic pump.

U.S. Pat. No. 4,194,650 disclosed a novel dispensing device wherein the flow rate of a liquid diluent was kept at a constant rate and the flow rate of a liquid concentrate was varied by varying the speed of a pumping motor to obtain a desired volumetric ratio of liquid concentrate to liquid diluent. This dispensing device performed very satisfactorily and advanced the art of dispensing and mixing of a liquid concentrate with a liquid diluent.

Therefore, it is a primary object of this invention to provide a liquid pump which improves upon the system and operation of the dispensing device set forth in U.S. Pat. No. 4,194,650. It is a further object of this invention to provide a liquid pump which substantially advances the liquid dispensing art.

Another object of this invention is to provide an improved pump and mixing device for pumping a liquid concentrate from a container and for mixing the concentrate with a diluent wherein the pump is disposable and may be shipped with the container of the liquid concentrate.

Another object of this invention is to provide an improved pump and mixing device for pumping a liquid concentrate from a container and for mixing the concentrate with a diluent wherein the pump accurately and reliably pumps liquid concentrate irrespective of the viscosity of the liquid concentrate.

Another object of this invention is to provide an improved pump and mixing device for pumping a liquid concentrate from a container and for mixing the concentrate with a diluent wherein the pump and mixing device is a reliable and inexpensive unit enabling the pump and mixing device to be discarded after the liquid concentrate within the container is depleted.

Another object of this invention is to provide an improved pump and mixing device for pumping a liquid concentrate from a container and for mixing the concentrate with a diluent wherein the container and the pump are adapted to inhibit the refilling of the container with liquid concentrate and the reuse of the pump thereby insuring the quality of the product internal the container.

Another object of this invention is to provide an improved pump and mixing device for pumping a liquid concentrate from a container and for mixing the concentrate with a diluent wherein the pump may be readily engaged with a motive means for reciprocating a portion of the pump for pumping the liquid concentrate from the container.

Another object of this invention is to provide an improved pump and mixing device for pumping a liquid concentrate from a container and for mixing the concentrate with a diluent wherein the pump may be coupled with motive means concurrently with the insertion of the container within a refrigerated compartment within the dispensing device.

Another object of this invention is to provide an improved pump and mixing device for pumping a liquid concentrate from a container and for mixing the concentrate with a diluent wherein a fluid coupling between the liquid diluent and the pump is accomplished concurrently with the insertion of the container within a concentrate compartment or a refrigerated concentrate compartment within the dispensing device.

Another object of this invention is to provide an improved pump and mixing device for pumping a liquid concentrate from a container and for mixing the concentrate with a diluent wherein the pump cooperates with the container to provide a one-way valve means for enabling the flow of the liquid concentrate only from the container into the pump.

Another object of this invention is to provide an improved pump and mixing device for pumping a liquid concentrate from a container and for mixing the concentrate with a diluent including an overcap for covering the pump secured upon the container and for sealing the pump to prevent contamination and leakage of the concentrate during shipment and storage.

Another object of this invention is to provide an improved pump and mixing device for pumping a liquid concentrate from a container and for mixing the concentrate with a diluent which substantially reduces the number of parts required for a liquid dispensing postmix machine of the type herein set forth.

Another object of this invention is to provide an improved method of venting a concentrate container to the atmosphere while simultaneously preventing leakage of the product during shipping, handling and use.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved method and apparatus for pumping a liquid from a container having container aperture means. The improved method and apparatus comprises a body member having an input body portion and an output body portion with flexible wall means interconnecting the input body portion and the output body portion. The flexible wall means defines a pumping chamber between the input body portion and the output body portion. The input body portion has an input aperture communicating with the pumping chamber whereas the output body portion has an output aperture communicating with the pumping chamber The input body portion is mounted relative to the container for enabling the liquid from the container to flow through the container aperture means into the input aperture of the input body portion.

An input one-way valve means cooperates with the input aperture of the input body portion for permitting the flow of liquid concentrate only from the container aperture means to the pumping chamber of the body member whereas an output one-way valve means cooperates with the output aperture of the output body portion for permitting the flow of liquid concentrate only from the pumping chamber of the body member to the output aperture of the output body portion. Motive means reciprocates the output body portion relative to the input body portion between a first and a second position for causing liquid concentrate to flow from the container aperture means through the input one-way valve means into the pumping chamber when the output body portion is move into the first position and for causing liquid concentrate to flow from the pumping chamber through the output one-way valve means when the output body portion is move into the second position.

In a more specific embodiment of the invention, the container aperture means include a plurality of container apertures disposed in a cap of the container. Mounting means is integrally formed in a flexible body member for resiliently grasping the cap of the container means. Preferably, the input body portion and the output body portion are integrally formed with the flexible wall means. In one embodiment, the input one way valve means and the output one way valve means are integrally formed with the body portion. In another embodiment of the invention, the input one way valve means is secured to the cap of the container.

The motive means may include a motor driving a reciprocating arm with the reciprocating arm having first coupling means for engaging with second coupling means on the output body portion for reciprocating the output body portion relative to the input body portion between a first and a second position. Preferably, a mixing chamber is defined in the output body portion of the body member with the mixing chamber communicating with the output aperture for receiving the container liquid concentrate from the pumping chamber. A mixing port is defined in the body member for introducing a liquid diluent into the mixing chamber for mixing with the liquid concentrate form the container. The mixing chamber reciprocates between the first position and the second position upon reciprocation of the output body portion for facilitating the mixing of the mixing diluent with the liquid concentrate.

In another embodiment of the invention, a terminal passage communicates with the mixing chamber with the terminal passage defining a terminal orifice for discharging the liquid concentrate and the mixing diluent therefrom. Preferably, the terminal passage and the terminal orifice are defined in the output body portion with the mixing chamber being integrally formed with the body member and being interposed between the output aperture of the pumping chamber and the terminal orifice.

In one embodiment of the invention, a concentrate container is provided with an improved container cap which prevents the unauthorized removal thereof and which provides a liquid tight seal during shipping while allowing the container to be vented to atmospheric pressure during use of the invention.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 24 is an exploded view of the third embodiment of the pump of FIGS. 21-23A and the container;

FIG. 25 is an assembled view of the third embodiment of the pump of FIGS. 21-23A and the container;

Throughout the specification and drawings. similar reference characters refer to similar parts throughout the several figures of the drawings.

DETAILED DISCUSSION

Figure 1:
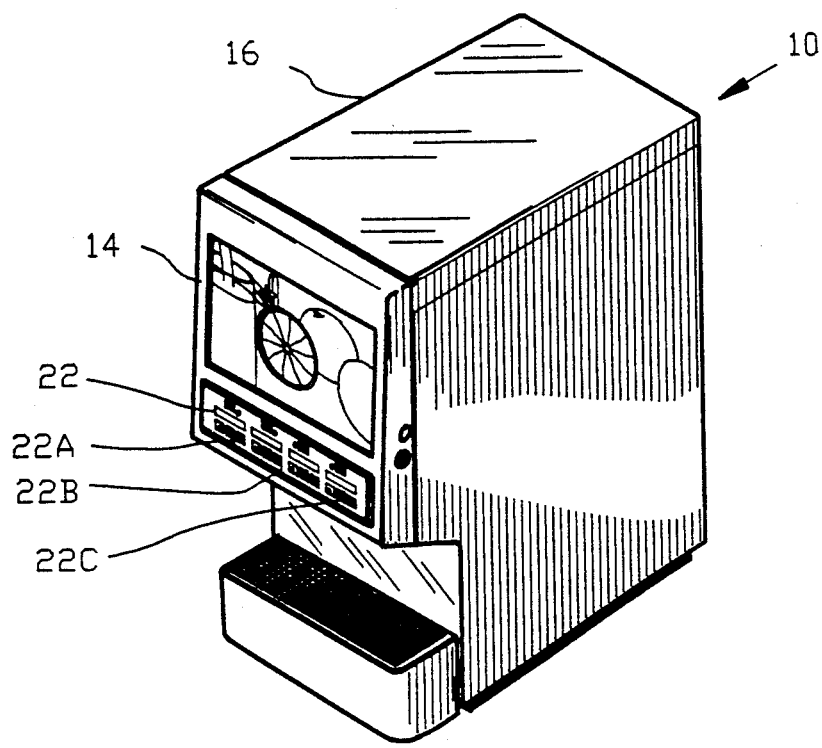
FIG. 1 is a isometric view of a dispenser device incorporating present invention.
Figure 2:
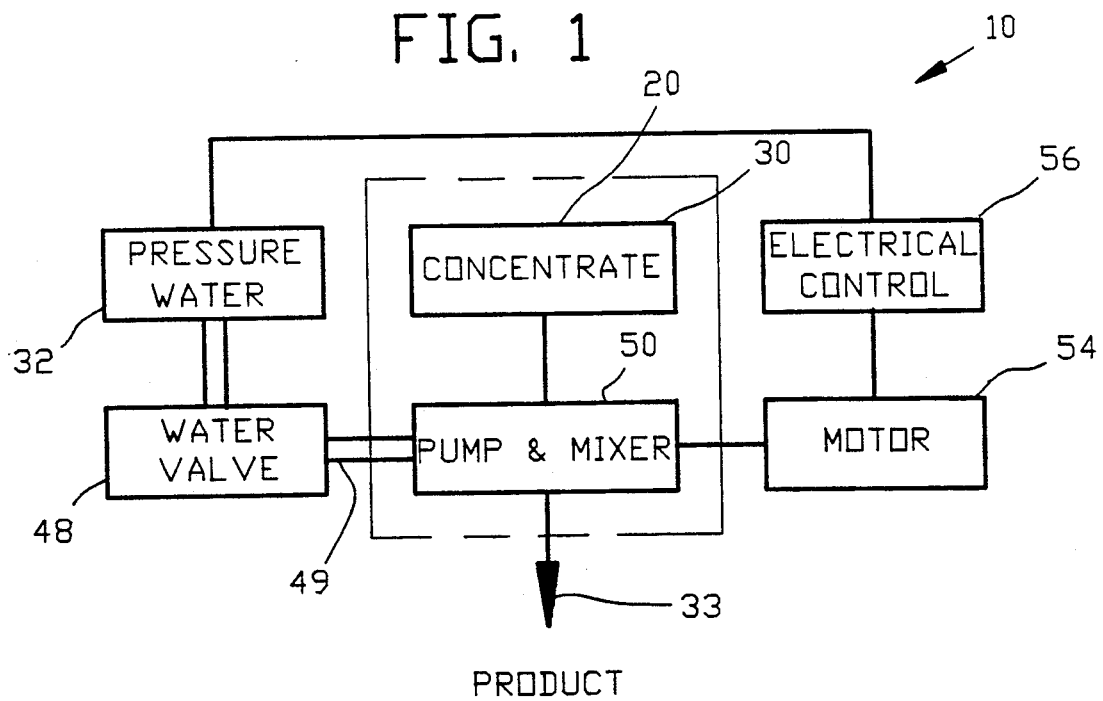
FIG. 2 is a block diagram illustrating the mechanism of the dispenser device of FIG. 1.
Figure 3:
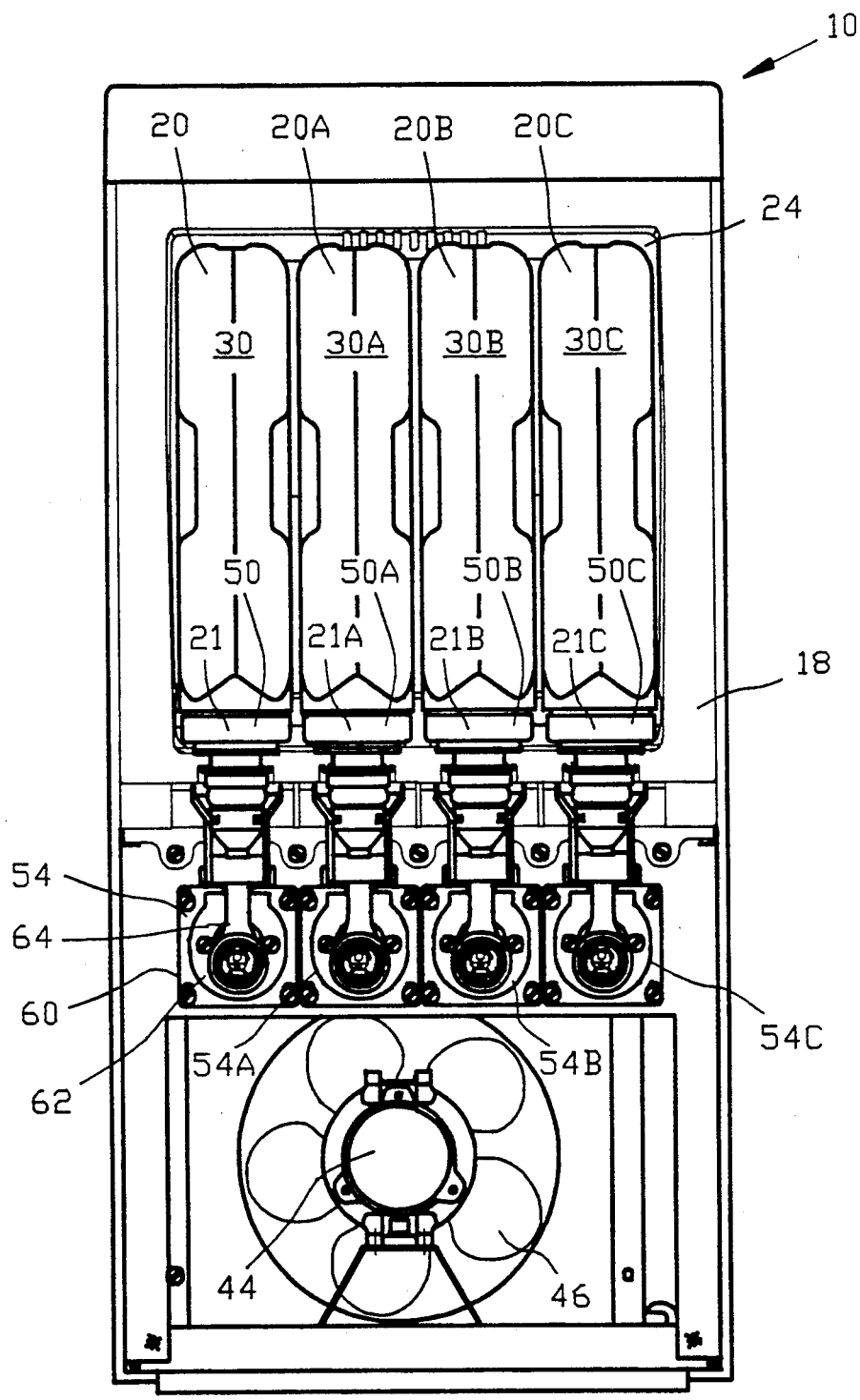
FIG. 3 is a front view of the interior of the dispenser device of FIG. 1.
Figure 4:
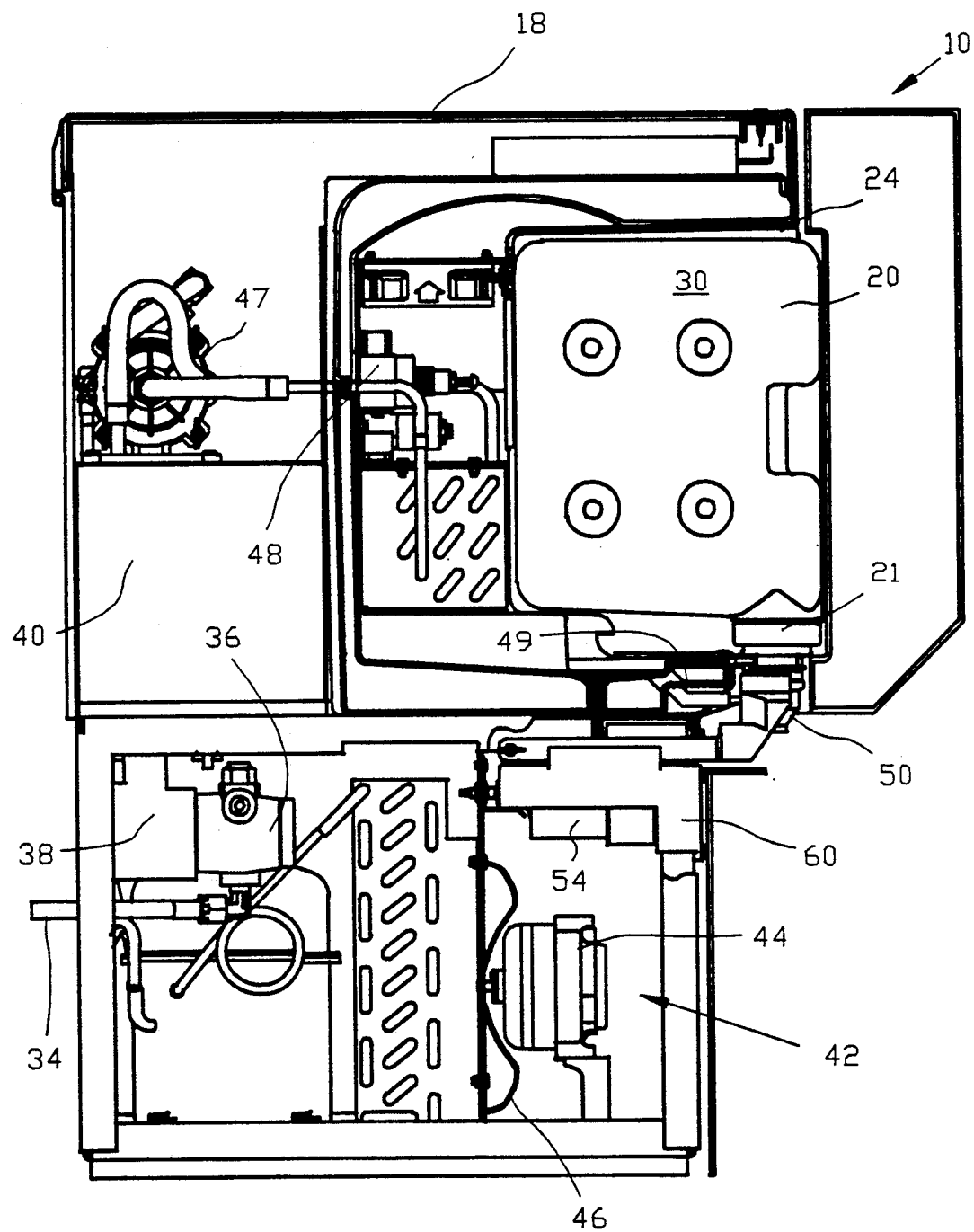
FIG. 4 is a side view of the interior of the dispenser device of FIG. 1.

FIG. 1 is an isometric view of a dispenser device 10 for pumping a liquid into cup or other vessel (not shown). FIG. 2 is a block diagram illustrating the mechanism of the dispenser device 10. FIGS. 3 and 4 illustrate a front view and a side view of the interior of the dispensing device 10 of FIG. 1 with a front cover 14 and a side cover 16 being removed from a main frame 18 of the dispenser device 10. The dispenser 10 is shown being able to pump four separate liquids concentrates from four separate containers 20, 20A, 20B and 20C having attached container caps 21, 21A, 21B and 21C upon activation of operator controls 22, 22A, 22B and 22C but it should be understood that the present invention may be incorporated into a dispenser device 10 for pumping a single liquid concentrate from a single container 20. The containers 20, 20A, 20B and 20C and the attached container caps 21, 21A, 21B and 21C are removably received within a refrigeration compartment 24 and are inserted within the refrigeration compartment 24 by inserting the containers 20, 20A, 20B and 20C through the front of the dispensing device 10 when the front cover 14 is opened or removed from the main frame 18 of the dispenser device 10. Preferably, the front cover 14 is pivotably mounted to the main frame 18. Each of the containers 20, 20A, 20B and 20C store a concentrate 30, 30A, 30B and 30C for mixing with a liquid diluent 32 for providing an end product 33.

The liquid diluent 32 such as water under pressure from a conduit 34 enter through a liquid pressure regulator 36 into a valve 38. An input valve 38 as best shown in FIG. 4, controls the flow of the liquid diluent under pressure into a liquid diluent reservoir 40. A refrigeration unit 42 including a motor 44, a compressor 45 and a fan 46, refrigerates the liquid diluent 32 within the reservoir 40. The liquid diluent 32 within the reservoir 40 is circulated by a circulation pump 47 between the refrigerated reservoir 40 and the refrigeration compartment 24 for maintaining the temperature of the liquid concentrates 30, 30A, 30B and 30C at a proper chilled temperature. A liquid diluent flow control valve 48 controls the flow of the liquid diluent 32 from the reservoir 40 to pumping and mixing devices 50, 50A, 50B and 50C through flexible conduits such as flexible conduit 49. The concentrates 30, 30A. 30B and 30C from the containers 20, 20A, 20B and 20C are received by the pumping and mixing devices 50, 50A, 50B and 50C which are operated by motive means including pumping motors 54, 54A, 54B and 54C. An electrical control 56 operates of the dispenser device 10 in response to the operator controls 22, 22A, 22B and 22C. Upon activation of one of the operator controls 22, 22A, 22B and 22C, the electrical control 56 energizes flow control valve 48 and a selected one of the pumping motors 54, 54A, 54B and 54C for mixing the liquid diluent 32 with a selected one of the concentrates 30, 30A, 30B and 30C from the containers 20, 20A, 20B and 20C to produce an end product 33. The control means 56 simultaneously energizes the liquid flow control valve 48 and the motor 54 for mixing a selected amount of the liquid concentrate 30 with a selected amount of the liquid diluent 32. The electrical control 56 is capable of varying the speed of the pumping motors 54, 54A, 54B and 54C for varying the flow rate of the concentrates 30, 30A, 30B and 30C from the containers 20, 20A, 20B and 20C. The flow rate of the liquid diluent 32 is maintained at a constant flow rate by the liquid pressure regulator 36. The flow rate of the liquid concentrates 30, 30A, 30B and 30C may be varied by changing the speed of the pumping motors 54, 54A, 54B and 54C. Accordingly, a desired volumetric ratio for each of the liquid concentrates 30, 30A, 30B and 30C to liquid diluent 32 may be established for each of the liquid concentrates 30, 30A, 30B and 30C in a manner similar to the system set forth in U.S. Pat. No. 4,194,650. Furthermore, different volumetric ratios of liquid concentrate to liquid diluent 32 for each of the concentrates 30, 30A, 30B and 30C may be provided by establishing different pumping rates through different pumping speeds of the pumping motors 54, 54A, 54B and 54C.

Figure 5:
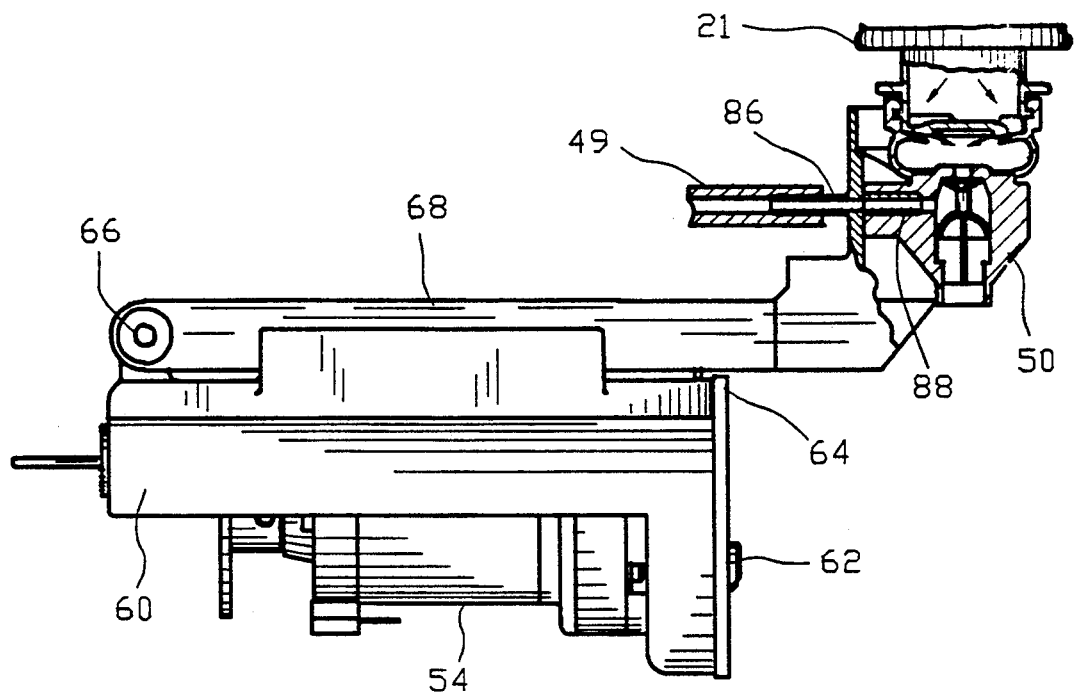
FIG. 5 is an enlarged view of the dispensing mechanism of the dispenser device with a pump shown in a first position.
Figure 6:
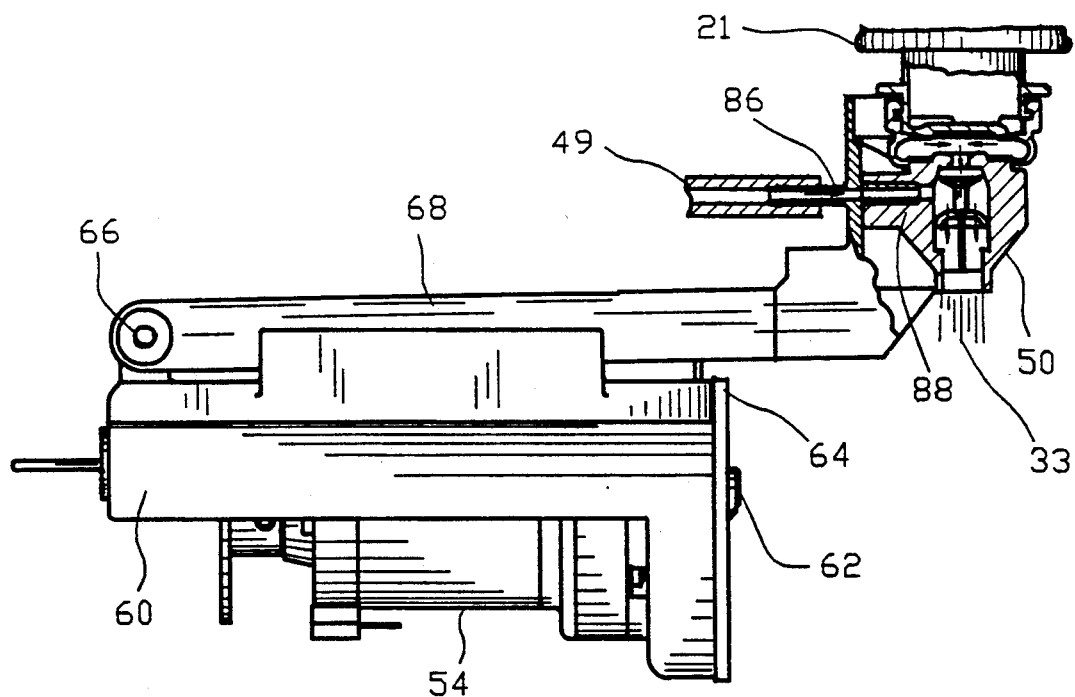
FIG. 6 is an enlarged view of the dispensing mechanism of the dispenser device with the pump shown in a second position.

FIGS. 5 and 6 illustrate enlarged views of the pumping and mixing device 50 and the motive means including the pumping motor 54 which are identical to the pumping and mixing devices 50A, 50B and 50C and the pumping motors 54A, 54B and 54C. FIG. 5 illustrates the pumping and mixing device 50 in a first position whereas FIG. 6 illustrates the pumping and mixing device 50 in a second position. The motive means includes the pumping motor 54 received within a motor frame 60 which motor frame 60 is secured to the main frame 18. As best shown in FIG. 3, the pumping motor 54 includes an eccentric 62 for reciprocating a driving arm 64. The motor frame 60 as illustrates in FIGS. 5 and 6 includes a pivot 66 for pivotably mounting a pivot arm 68. The driving arm 64 pivots the pivot arm 68 about pivot 66 between the first position shown in FIG. 5 and the second position shown in FIG. 6.

Figure 7:
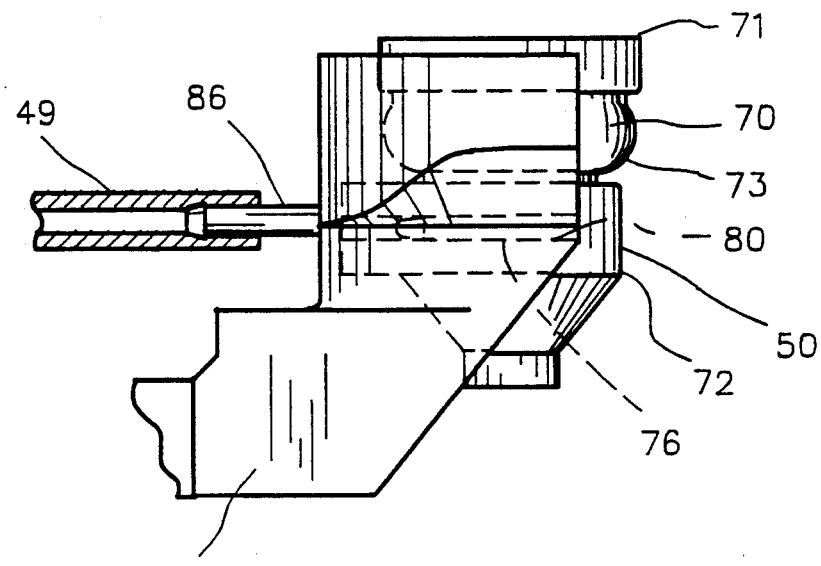
FIG. 7 is a side view of a portion of the dispensing mechanism shown in FIGS. 5 and 6 illustrating the interconnection of the dispensing mechanism with the pump.
Figure 8:
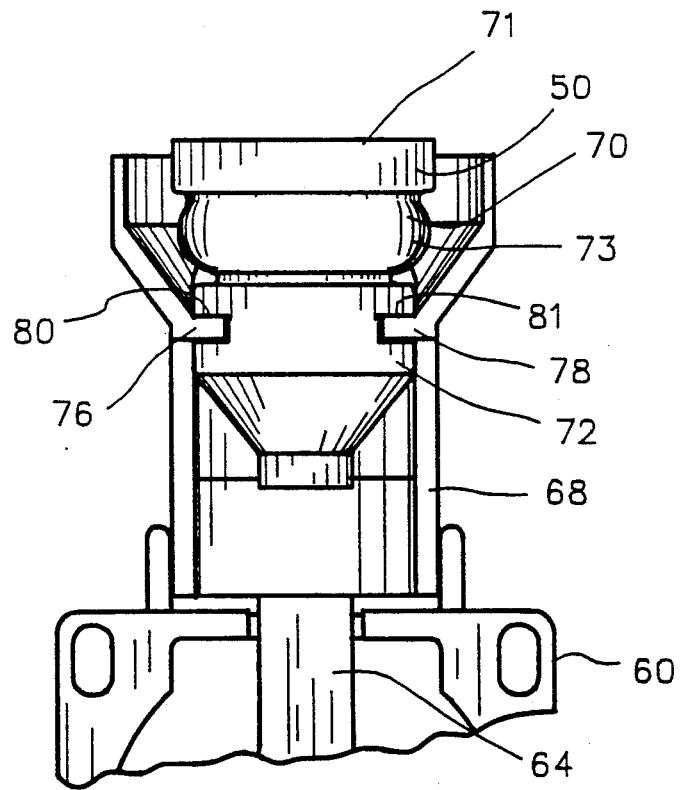
FIG. 8 is a front view of FIG. 7.
Figure 9:
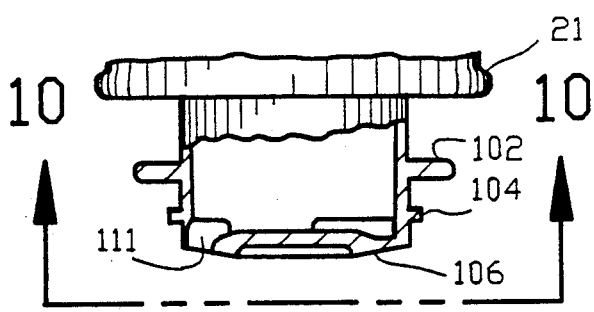
FIG. 9 is an enlarged partial view of a container of the dispenser device illustrating the container aperture.
Figure 10:
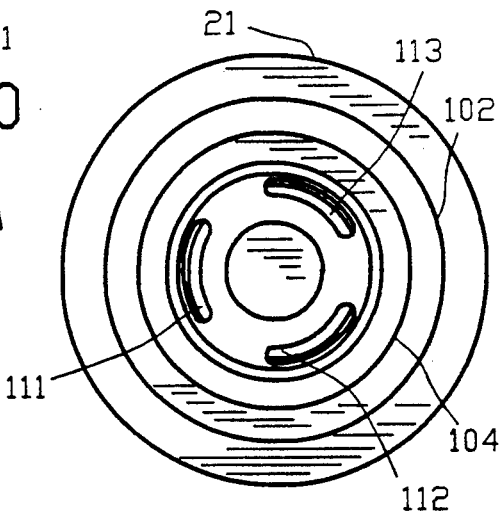
FIG. 10 is a view along line 10—10 of FIG. 9.
Figure 11:
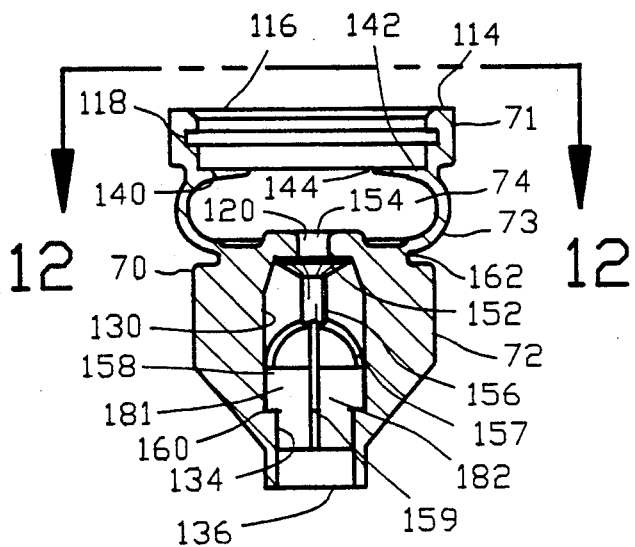
FIG. 11 is an enlarged sectional view of a first embodiment of a pump for the dispenser device.
Figure 12:
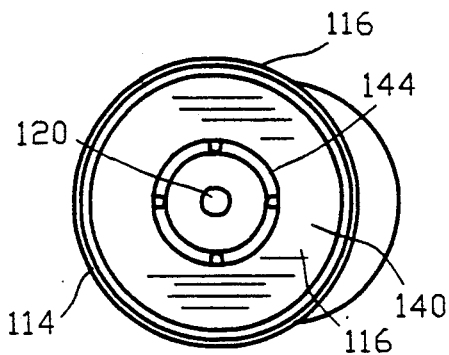
FIG. 12 is a view along line 12—12 of FIG. 11.

FIGS. 7 and 8 are side and front views of a portion of the pumping and mixing device 50 and the pumping motor 54. The pumping and mixing device 50 comprises a body member 70 having an input body portion 71 and an output body portion 72 with flexible wall means 73 interconnecting the input body portion 71 and the output body portion 72. The input body portion 71 of the pumping and mixing device 50 is secured to the container cap 21 of the container 20 which container 20 is fixed relative to the main frame 18. The output body portion 72 includes coupling means integrally formed in the output body portion 72 for mechanically coupling the output body portion 72 to the motor 54. As best shown in FIGS. 7 and 8, the pivot arm 68 includes plural opposed fingers 76 and 78 which are received within recesses 80 and 82 the output body portion 72 pumping and mixing device 50.

When the pumping motor 54 rotates, the pivot arm 68 moves the output body portion 72 relative to the input body portion 71 of the pumping and mixing device 50 between the first position shown in FIG. 5 and the second position shown in FIG. 6. The flexible wall means 73 defines a pumping chamber 74 for pumping the liquid concentrate 30 from the container 20 to mix with the liquid diluent 32 when the output body portion 72 is moved between the first and second position as will be described in greater detail hereinafter. The flexible conduit 49 provides a fluid coupling between the stationary flow control valve 48 secured to the main frame 18 and the reciprocating output body portion 72 of the pumping and mixing device 50.

In this embodiment, the plural opposed fingers 76 and 78 the pivot arm 68 are received within recesses 80 and 82 in the output body portion 72 of the pumping and mixing device 50 when the container 20 and the container cap 21 are inserted within a refrigerated compartment 24 of the dispensing device 10. The pivot arm 68 also includes a tubular member 86 which is connected to the flexible conduit 49 receiving the flow of the liquid diluent 32 from the reservoir 40. The tubular member 86 of the pivot arm 68 is received within a mixing port 88 defined in the output body portion 72 of the pumping and mixing device 50 when the container 20 and the container cap 21 are inserted within the refrigerated compartment 24 of the dispensing device 10. Accordingly, the plural opposed fingers 76 and 78 and the recesses 80 and 82 mechanically couple the output body portion 72 of the pumping and mixing device 50 to the pivot arm 68 whereas the tubular member 86 and the mixing port 88 fluidly couple the pumping and mixing device 50 to the pivot arm 68 when the container 20 and the container cap 21 are inserted within a refrigerated compartment 24 of the dispensing device 10.

FIGS. 9-14 illustrate enlarged partial views of the container 10 in combination with the pumping and mixing device 50. The container cap 21 has an annular shoulder 102 and an annular projection 104. A face surface 106 defines container aperture means shown as plural arcuate apertures 111, 112 and 113 for discharging the concentrate 30 internal the container 20. The pumping and mixing device 50 of the present invention including the input body portion 71, the output body portion 72 and the flexible wall means 73 is preferably constructed from a unitary flexible polymeric material such as a thermoplastic elastomer or a thermoplastic rubber or any other suitable material.

The input body portion 71 of the pumping and mixing device 50 includes a terminal end 114 defining an input aperture 116 communicating with the pumping chamber 74. An annular recess 118 is provided in the input aperture 116 for resiliently receiving the annular projection 104 of the container cap 21 for securing the pumping and mixing device 50 to the container cap 21. The plural arcuate apertures 111, 112 and 113 of the container cap 21 in combination with the input aperture 116 of the pumping and mixing device 50 enable the concentrate 30 from the container 20 to flow through the arcuate apertures 111, 112 and 113 into the input aperture 116 of the input body portion 71 and into the pumping chamber 74.

The output body portion 72 defines an output aperture 120 communicating with the pumping chamber 74. The flexible wall 73 interconnecting the input body portion 71 with the output body portion 72 is relatively thin for enabling the output body portion 72 to move independently of the input body portion 71 for changing the volume of the pumping chamber 74.

A mixing chamber 130 is defined in the output body portion 72 of the body member 70 and communicates with the output aperture 120 for receiving the concentrate liquid 30 from the pumping chamber 74. A terminal passage 134 is integrally formed in the output body portion 72 and communicates with the mixing chamber 130. The terminal passage 134 defines a terminal orifice 136 for discharging the mixture 33 of the concentrate liquid 30 and the diluent liquid 32.

An input one-way valve means 140 is disposed in the input aperture 116 of the input body portion 71 for permitting the flow of liquid concentrate 30 only from the plural arcuate apertures 111, 112 and 113 to the pumping chamber 74 of the body member 70. The input one-way valve means 140 is integrally formed with the body member 70 and extends from a base 142 proximate the interface of the input body portion 71 and the flexible wall portion 73 to a distal end 144. As it can be clearly seen in FIGS. 13 and 14, the input one-way valve means 140 engages an overlaid portion 146 the face surface 106 of the container cap 21 to overlays the plural arcuate apertures 111, 112 and 113. Since the input one-way valve means 140 is integrally fabricated from the same resilient material as the body portion 70 and since the input one-way valve means 140 tapers from the base 142 to the distal end 144, the input one-way valve means 140 resiliently engages the overlaid portion 146 of the face surface 106 of the container cap 21.

Figure 13:
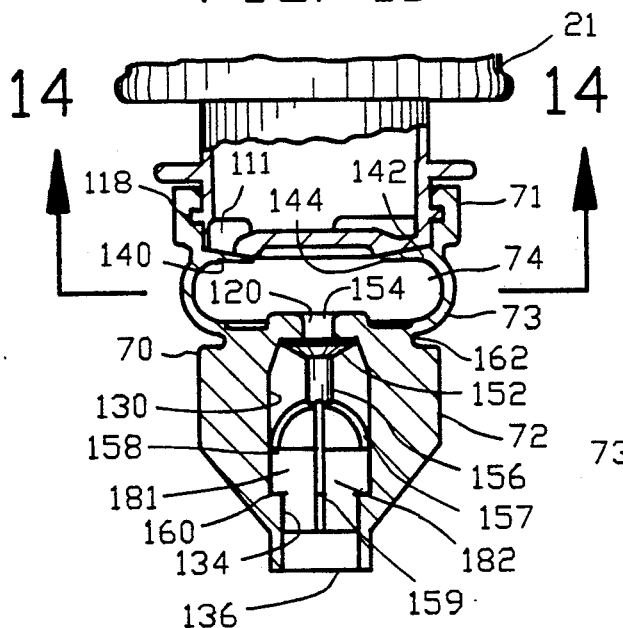
FIG. 13 is an enlarged partial view of the first embodiment of a pump of FIGS. 11 and 12 coupled to the container shown in FIGS. 9 and 10.
Figure 14:
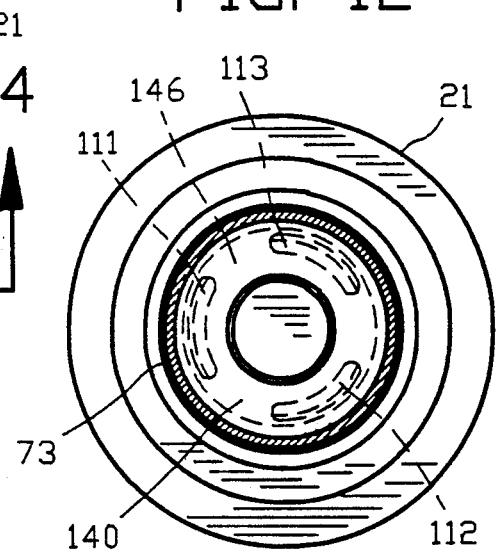
FIG. 14 is a sectional view along line 14—14 of FIG. 13.

When a fluid pressure is greater in the arcuate apertures 111, 112 and 113 than the fluid pressure in the pumping chamber 74, then the input one-way valve means 140 will flex downwardly in FIG. 13 from the overlaid portion 146 permitting the flow of concentrate 30 from the arcuate apertures 111, 112 and 113 into the pumping chamber 74. When a fluid pressure is less in the arcuate apertures 111, 112 and 113 than the fluid pressure in the pumping chamber 74, then the input one-way valve means 140 will engage the overlaid portion 146 as shown in FIG. 13 to prevent the flow of the concentrate 30 from the arcuate apertures 111, 112 and 113 into the pumping chamber 74.

An output one-way valve means 152 is disposed within the mixing chamber 130 and cooperates with the output aperture 120 of the output body portion 72 for permitting the flow of liquid concentrate 30 only from the pumping chamber 74 of the body member 70. The output one-way valve means 152 comprises a valve surface 154 affixed to a shaft 156 which is supported by a flexible web 157. The flexible web 157 is integrally affixed to cross members 158 and 159. The base of the cross members 158 and 159 engage a shoulder 160 defined in the mixing chamber 130 to retain the output one-way valve means 152 within the mixing chamber 130 such that the valve surface 154 engages an upper surface 162 of the mixing chamber 130 to overlay the output aperture 120. Preferably, the output one-way valve means 152 including the valve surface 154, shaft 156, flexible web 157 and the cross members 158 and 159 are integrally molded from a polymeric material such as silicone or any other suitable material.

When a fluid pressure is greater in the pumping chamber 74 than the fluid pressure in the mixing chamber 130, then the flexible web 157 will flex downwardly in FIG. 13 from the overlaid portion 146 permitting the flow of the concentrate 30 from the pumping chamber 74 into the mixing chamber 130. When a fluid pressure is less in the pumping chamber 74 than the fluid pressure in the mixing chamber 130, then the valve surface 154 will remain in the overlaying position shown in FIG. 13 and prevent the flow of the concentrate 30 from the pumping chamber 74 into the mixing chamber 130.

Figures 15, 15A:
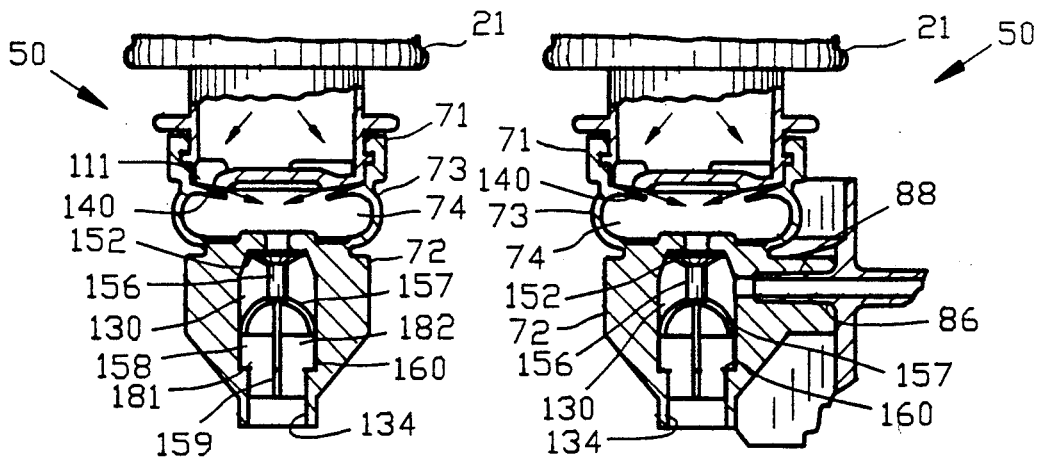
FIG. 15 is a front sectional view of a first embodiment of the pump with the pump being shown in a first position.
FIG. 15A is an side sectional of FIG. 15.
Figures 16, 16A:
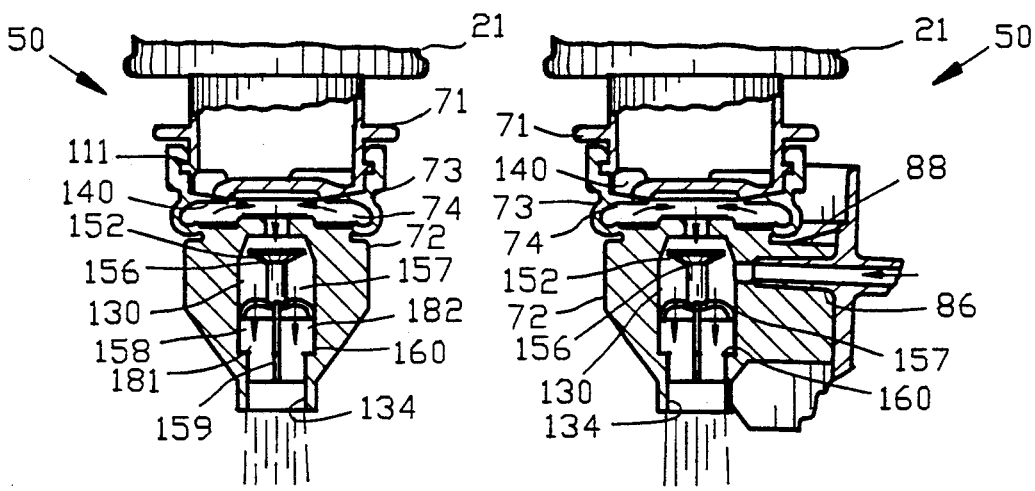
FIG. 16 is a front sectional view of the first embodiment of the pump with the pump being shown in a second position.
FIG. 16A is an side sectional of FIG. 16.
Figures 17, 17A:
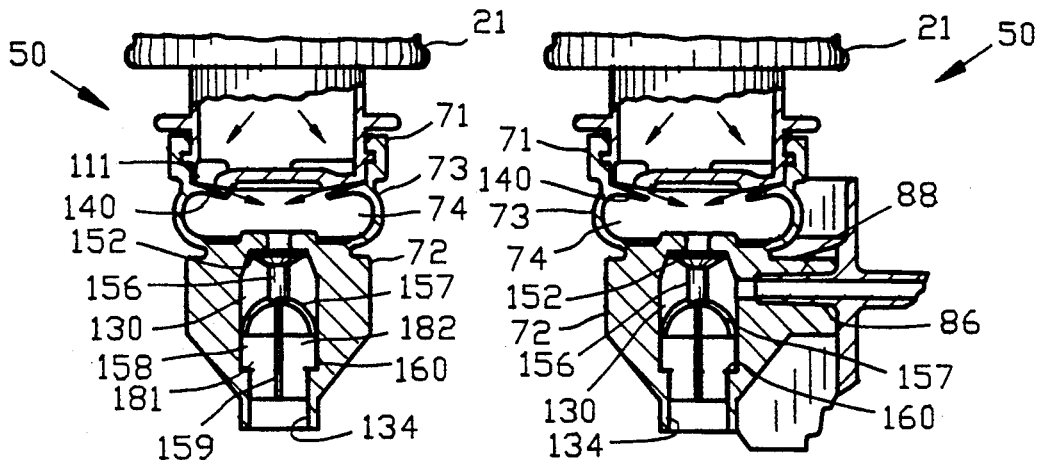
FIG. 17 is a front sectional view of the first embodiment of the pump with the pump shown being returned to the first position.
FIG. 17A is an side sectional of FIG. 17.

FIGS. 15 and 15A are sectional views of the first embodiment of the pumping and mixing device 50 with the pump and mixing device 50 being shown in a first position. FIGS. 16 and 16A illustrate the first embodiment of the pump and mixing device 50 in a second position whereas FIGS. 17 and 17A illustrate the first embodiment of the pump and mixing device 50 returned to the first position. The motive means including motor 54 reciprocates the output body portion 72 relative to the input body portion 71 between the first and the second position for causing the liquid concentrate 30 to flow from the arcuate apertures 111, 112 and 113 of the container cap 21 through the input one-way valve means 140 into the pumping chamber 74 when the output body portion 72 is move into the first position and for causing the liquid concentrate 30 to flow from the pumping chamber 74 through the output one-way valve means 152 when the output body portion 72 is move into the second position.

When the motive means including motor 54 reciprocates the output body portion 72 from the second position shown in FIGS. 16 and 16A to the first position shown in FIGS. 15 and 15A, the volume of the pumping chamber 74 expands thereby reducing the pressure internal the pumping chamber 74 such that atmospheric pressure will move the valve surface 154 of the output one way valve 152 into the overlaying position shown in FIGS. 15 and 15A thus closing the output one way valve 152. Since the fluid pressure is now greater in the arcuate apertures 111, 112 and 113 than the fluid pressure internal the pumping chamber 74, the input one-way valve means 140 will flex downwardly as shown in FIGS. 15 and 15A to open the input one-way valve means 140 and to permit the flow of liquid concentrate 30 from the arcuate apertures 111, 112 and 113 into the pumping chamber 74.

When the motive means including motor 54 reciprocates the output body portion 72 from the first position shown in FIGS. 15 and 15A into the second position shown in FIGS. 16 and 16A, the volume of the pumping chamber 74 contracts thereby increasing the pressure internal the pumping chamber 74 such that the input one-way valve means 140 will move into the overlaying position shown in FIGS. 16 and 16A thus closing input one-way valve means 140 and preventing the further flow of liquid concentrate 30 from the arcuate apertures 111, 112 and 113 into the pumping chamber 74. Since the fluid pressure internal the pumping chamber 74 is now greater than the atmospheric pressure, the output one way valve 152 is displaced from the overlaying position shown in FIGS. 15 and 15A into the open position shown in FIGS. 16 and 16A thus permitting the flow of liquid concentrate 30 from the pumping chamber 74 into the mixing chamber 130.

When the motive means including motor 54 reciprocates the output body portion 72 from the second position shown in FIGS. 16 and 16A to the first position shown in FIGS. 17 and 17A, the volume of the pumping chamber 74 again expands thereby reducing the pressure internal the pumping chamber 74 to close the output one way valve 152. The greater fluid pressure in the arcuate apertures 111, 112 and 113 opens the input one-way valve means 140 to permit the flow of liquid concentrate 30 from the arcuate apertures 111, 112 and 113 into the pumping chamber 74. Continued reciprocation the output body portion 72 relative to the input body portion 71 between the first and the second position will continuously cause the liquid concentrate 30 to flow from the arcuate apertures 111, 112 and 113 of the container cap 21 through the pumping chamber 74 and into the mixing chamber 130 as heretofore described.

FIGS. 15A, 16A and 17A further illustrate the mixing port 88 defined in the body member 70 for introducing the diluent liquid 32 into the mixing chamber 130. The mixing port 88 resiliently receives the tubular member 86 of the pivot arm 68 for providing a fluid tight seal. The liquid diluent 32 enters the mixing chamber 130 under pressure controlled by valve 48. The liquid diluent 32 enters the mixing chamber 130 at a right angle to the flow of the liquid concentrate 30 and proximate to the shaft 156 causing a turbulence for facilitating the mixing of the liquid concentrate 30 with the liquid diluent 32. Furthermore, the reciprocation of the mixing chamber 130 concurrently with the reciprocation of the output body member 72 between the first and the second position assists in the mixing of the liquid diluent 32 with the liquid concentrate 30.

Figure 17B:
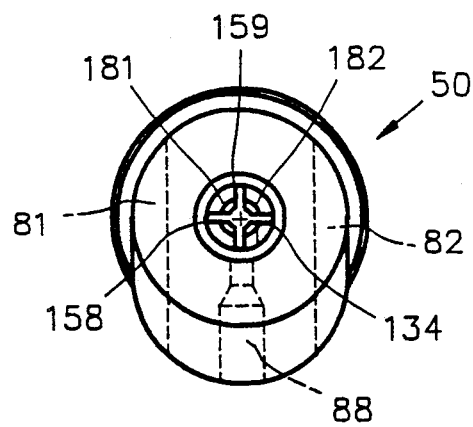
FIG. 17B is a partial bottom view of FIG. 17.

The liquid diluent 32 and liquid concentrate 30 flows through the web 157 and enters sectors including sectors 181 and 182 defined by the cross members 158 and 159. The sectors including sectors 181 and 182, as also shown in FIG. 17B, modify the turbulent flow of the mixed liquid diluent 32 and liquid concentrate 30 proximate the shaft 156 into a substantially laminar flow from the terminal orifice 136.

Figures 18, 18A:
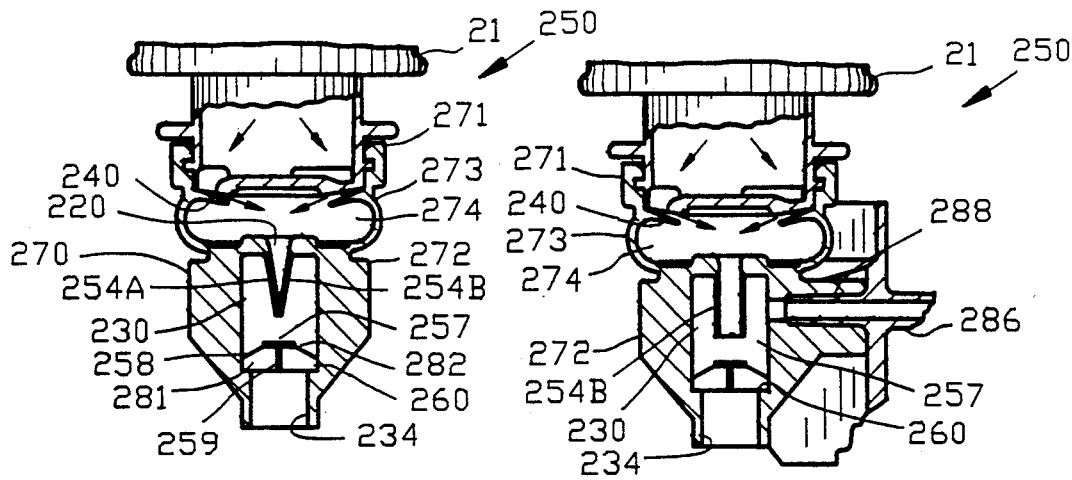
FIG. 18 is a front sectional view of a second embodiment of the pump with the pump being shown in a first position.
FIG. 18A is an side sectional of FIG. 18.
Figures 19, 19A:
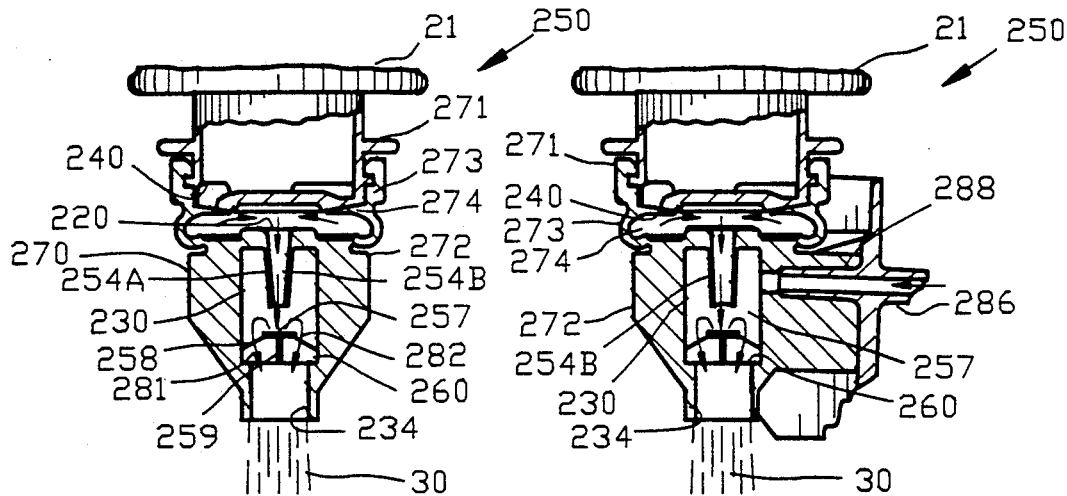
FIG. 19 is a front sectional view of the second embodiment of the pump with the pump being shown in a second position.
FIG. 19A is an side sectional of FIG. 19.
Figures 20, 20A:
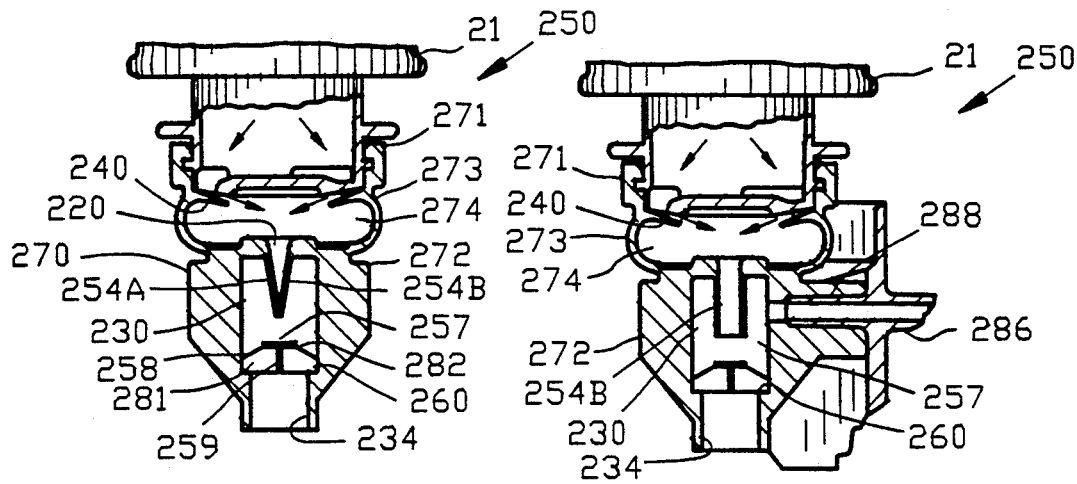
FIG. 20 is a front sectional view of the second embodiment of the pump with the pump being shown returned to the first position.
FIG. 20A is an side sectional of FIG. 20.

FIGS. 18 and 18A are sectional views of a second embodiment of the pumping and mixing device 250 with the pump and mixing device 250 being shown in a first position. FIGS. 19 and 19A illustrate the second embodiment of the pump and mixing device 250 in a second position whereas FIGS. 20 and 20A illustrate the second embodiment of the pump and mixing device 250 returned to the first position. In this embodiment, the input body portion 271 including the input one-way valve means 240 and the flexible wall 273 of the pumping and mixing device 250 are identical to the input body portion 71, the input one-way valve means 140 and the flexible wall 73 of the pumping and mixing device 50 illustrated in FIGS. 15-17. In addition, the output body portion 272 including the mixing chamber 230 and the terminal passage 234 are identical to the output body portion 72, the mixing chamber 130 and the terminal passage 134 of the pumping and mixing device 50 illustrated in FIGS. 15-17.

In this embodiment, the output one-way valve means 250 is integrally formed within the mixing chamber 230 and cooperates with the output aperture 220 of the output body portion 272 for permitting the flow of liquid concentrate 30 only from the pumping chamber 274 of the body member 270. The output one-way valve means 252 comprises a sphincter valve having a first and a second flexible valve surface 254A and 254B which are biased into engagement with one another as shown in FIGS. 18 and 18A. When the fluid pressure in the pumping chamber 274 is greater than the fluid pressure in the mixing chamber 230, then the first and second flexible valve surface 254A and 254B separate from one another permitting the flow of fluid from the pumping chamber 274 into the mixing chamber 230. When a fluid pressure in the pumping chamber 274 is less than the fluid pressure in the mixing chamber 230, then the valve surfaces 254A and 254B will remain in the biased engagement position to prevent the flow of fluid from the mixing chamber 230 into the pumping chamber 274.

A horizontal surface member 257 supported cross members 258 and 259 is disposed in the mixing chamber 230. A base of each of the cross members 258 and 259 engage a shoulder 260 defined in the mixing chamber 230 to retain the horizontal surface member within the mixing chamber 230. The cross members 258 and 259 define sectors including sectors 281 and 282 in a manner similar to FIGS. 15-17.

When the motive means including motor 54 reciprocates the output body portion 272 from the second position shown in FIGS. 19 and 19A to the first position shown in FIGS. 18 and 18A, the volume of the pumping chamber 274 expands thereby reducing the pressure internal the pumping chamber 274 such that the valve surface 254A and 254B of the output one way valve 252 will move into engagement with one another as shown in FIGS. 18 and 18A thus closing the output one way valve 252. Since the fluid pressure in the arcuate apertures 111, 112 and 113 is now greater than the fluid pressure internal the pumping chamber 274, the input one-way valve means 240 will flex downwardly as shown in FIGS. 18 and 18A to open the input one-way valve means 240 and to permit the flow of liquid concentrate 30 from the arcuate apertures 111, 112 and 113 into the pumping chamber 274.

When the motive means including motor 54 reciprocates the output body portion 272 from the first position shown in FIGS. 18 and 18A into the second position shown in FIGS. 19 and 19A, the volume of the pumping chamber 274 contracts thereby increasing the pressure internal the pumping chamber 274 such that the input one-way valve means 240 will move into the overlaying position shown in FIGS. 19 and 19A thus closing input one-way valve means 240 and preventing the further flow of liquid concentrate 30 from the arcuate apertures 111, 112 and 113 into the pumping chamber 274. Since the fluid pressure internal to the pumping chamber 274 is now greater than the atmospheric pressure, the first and second flexible valve surfaces 254A and 254B of the output one way valve 252 separate from one another as shown in FIGS. 19 and 19A into the open position thus permitting the flow of liquid concentrate 30 from the pumping chamber 274 into the mixing chamber 230.

When the motive means including motor 54 reciprocates the output body portion 272 from the second position shown in FIGS. 19 and 19A to the first position shown in FIGS. 20 and 20A, the volume of the pumping chamber 274 again expands thereby reducing the pressure internal the pumping chamber 274 to close the output one way valve 252. The greater fluid pressure in the arcuate apertures 111, 112 and 113 opens the input one-way valve means 240 to permit the flow of liquid concentrate 30 from the arcuate apertures 111, 112 and 113 into the pumping chamber 274. Continued reciprocation of the output body portion 272 relative to the input body portion 271 between the first and the second position will continuously cause the liquid concentrate 30 to flow from the arcuate apertures 111, 112 and 113 of the container cap 21 through the pumping chamber 274 and into the mixing chamber 230 as heretofore described.

In a manner similar to FIGS. 15A, 16A and 17A, the mixing port 288 defined in the body member 270 resiliently receives the tubular member 86 of the pivot arm 68 for providing a fluid tight seal. The liquid concentrate 30 flowing through the output one way valve means 252 strikes the horizontal surface 257 and is deflected upwardly to mix with the liquid diluent 32 entering the mixing chamber 230 through the mixing port 288. The liquid diluent 32 entering the mixing chamber 230 and the upward deflection of the liquid concentrate 30 creates a turbulence for facilitating the mixing of the liquid concentrate 30 with the liquid diluent 32. Furthermore, the reciprocation of the mixing chamber 230 concurrently with the reciprocation of the output body member 272 between the first and the second position assists in the mixing of the liquid diluent 32 with the liquid concentrate 30.

The mixed liquid diluent 32 and liquid concentrate 30 enters the sectors including sectors 281 and 282 which modify the turbulent flow of the mixed liquid diluent 32 and liquid concentrate 30 into a substantially laminar flow from the terminal orifice 236.

Figure 21:
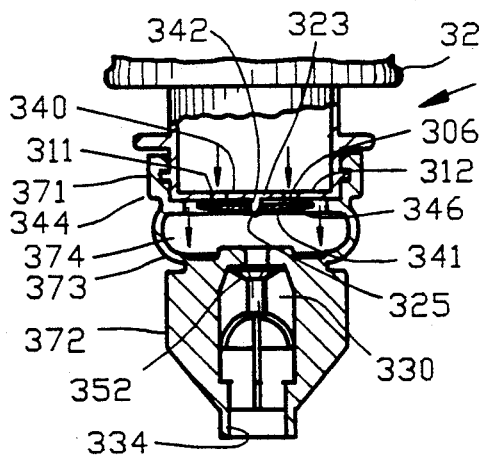
FIG. 21 is a front sectional of a third embodiment of the pump with the pump being shown in a first position.
Figure 21A:
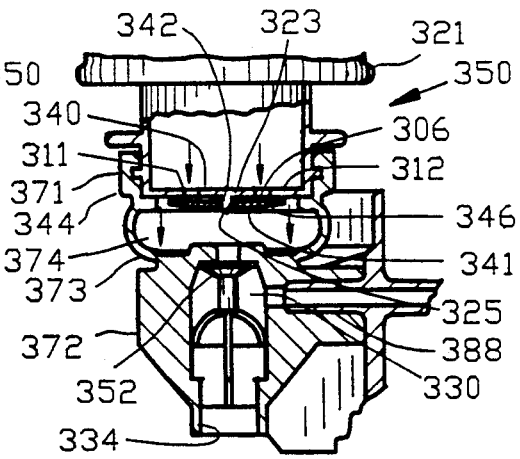
FIG. 21A is an side sectional of FIG. 21.
Figure 22:
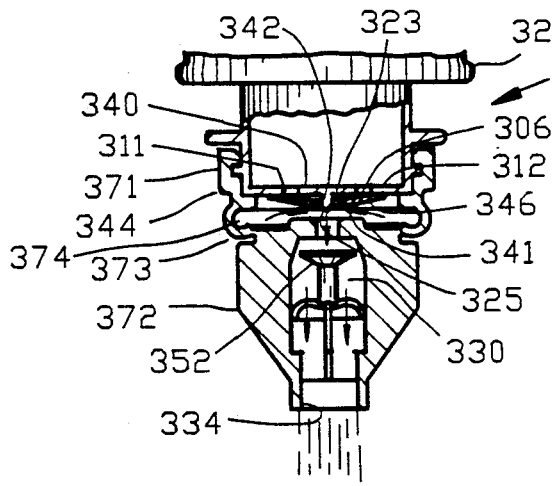
FIG. 22 is a front sectional view of the third embodiment of the pump with the pump being shown in a second position.
Figure 22A:
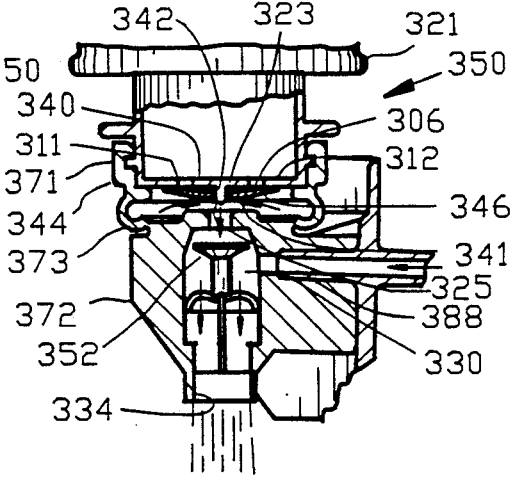
FIG. 22A is an side sectional of FIG. 22.
Figure 23:
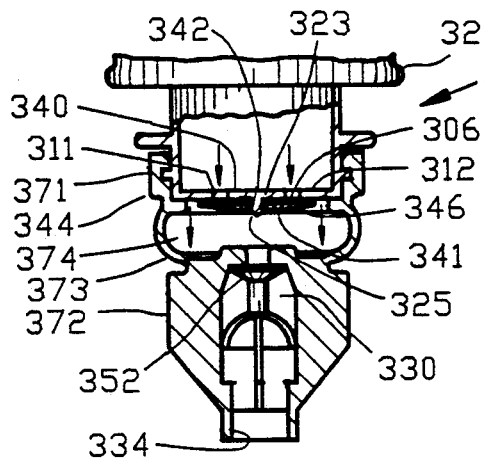
FIG. 23 is a front sectional view of the third embodiment of the pump with the pump being shown returned to the first position.
Figure 23A:
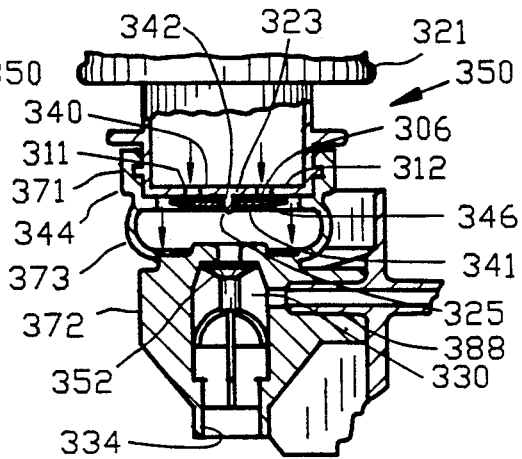
FIG. 23A is an side sectional of FIG. 23.

FIGS. 21 and 21A are sectional views of a third embodiment of the pumping and mixing device 350 with the pump and mixing device 350 being shown in a first position. FIGS. 22 and 22A illustrate the third embodiment of the pump and mixing device 350 in a second position whereas FIGS. 23 and 23A illustrate the third embodiment of the pump and mixing device 350 returned to the first position. In this embodiment, the output body portion 372 including the output one-way valve means 340 and the flexible wall 373 of the pumping and mixing device 350 are identical to the output body portion 72, the output one-way valve means 152 and the flexible wall 73 of the pumping and mixing device 50 illustrated in FIGS. 15-17. In addition, the output body portion 372 including the mixing chamber 330 and the terminal passage 334 are identical to the output body portion 72, the mixing chamber 130 and the terminal passage 134 of the pumping and mixing device 50 illustrated in FIGS. 15-17.

In this embodiment, the face surface 306 of the container cap 321 includes securing means shown as a shaft 323 having an enlarged head 325 extending from the container cap 321. The shaft 323 is disposed central the plural arcuate apertures 311, 312 and 313. The input one-way valve means 340 includes a saucer shaped resilient disk 341 having a central aperture 342 for securing to the shaft 323 extending from the container cap 321. The saucer shaped resilient disk 341 tapers in thickness from the central aperture 342 radially outward to have a thin periphery 344. When the saucer shaped resilient disk 341 is secured to the container cap 321, the saucer shaped disk 341 resiliently engages an overlaid portion 346 of the face surface 306 of the container cap 321 and overlays the plural arcuate apertures 311, 312 and 313.

When a fluid pressure in the arcuate apertures 311, 312 and 313 is greater than the fluid pressure in the pumping chamber 374, then the input one-way valve means 340 will flex downwardly in FIGS. 21 and 21A from the overlaid portion permitting the flow of concentrate 30 from the arcuate apertures 311, 312 and 313 into the pumping chamber 374. When a fluid pressure is less in the arcuate apertures 311, 312 and 313 than the fluid pressure in the pumping chamber 374, then the input one-way valve means 340 will remain in the overlaying position shown in FIG. 22 and prevent the flow of concentrate 30 from the arcuate apertures 311, 312 and 313 into the pumping chamber 374.

When the motive means including motor 54 reciprocates the output body portion 372 from the first position shown in FIGS. 21 and 21A into the second position shown in FIGS. 22 and 22A, the volume of the pumping chamber 374 contracts thereby increasing the pressure internal the pumping chamber 374 such that the input one-way valve means 340 will move into the overlaying position shown in FIGS. 22 and 22A thus closing input one-way valve means 340 and preventing the further flow of liquid concentrate 30 from the arcuate apertures 311, 312 and 313 into the pumping chamber 374. Since the fluid pressure internal the pumping chamber 374 is now greater than the atmospheric pressure, the output one way valve 352 is displaced from the overlaying position shown in FIGS. 21 and 21A into the open position shown in FIGS. 22 and 22A thus permitting the flow of liquid concentrate 30 from the pumping chamber 374 into the mixing chamber 330.

When the motive means including motor 54 reciprocates the output body portion 372 from the second position shown in FIGS. 22 and 22A to the first position shown in FIGS. 23 and 23A, the volume of the pumping chamber 374 again expands thereby reducing the pressure internal the pumping chamber 374 to close the output one way valve 352. The greater fluid pressure in the arcuate apertures 311, 312 and 313 opens the input one-way valve means 340 to permit the flow of liquid concentrate 30 from the arcuate apertures 311, 312 and 313 into the pumping chamber 374. Continued reciprocation the output body portion 372 relative to the input body portion 371 between the first and the second position will continuously cause the liquid concentrate 30 to flow from the arcuate apertures 311, 312 and 313 of the container cap 321 through the pumping chamber 374 and into the mixing chamber 330 as heretofore described.

FIGS. 21A, 22A and 23A further illustrate the mixing port 388 defined in the body member 370 for introducing the diluent liquid 32 into the mixing chamber 330. The mixing port 388 is identical to the mixing port 88 shown in FIGS. 15A, 16A and 17A.

Figure 26:
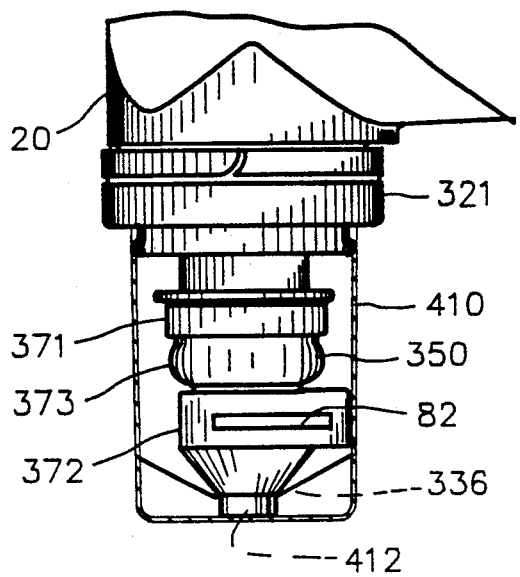
FIG. 26 is a partial sectional view of FIG. 25.
Figure 27:
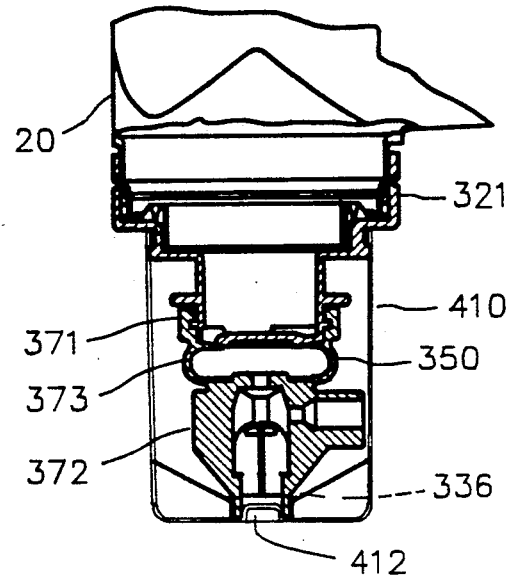
FIG. 27 is an enlarged sectional view of a portion of FIG. 25.

FIG. 24 is an exploded view of the third embodiment of the pump of FIGS. 21-23A and the container whereas FIG. 25 is an assembled view thereof. FIG. 26 is a partial sectional view of FIG. 25 whereas FIG. 27 is an enlarged sectional view of a portion of FIG. 25. A resilient gasket 400 is received within an opening 319 of the container 20 for seal the container cap 321 to the container 20. Preferably, the container cap 321 is sealed to the container 20 to prevent the unauthorized removal of the container cap 321. The seal between the container cap 321 and the container 20 prevents contamination and leakage of the concentrate 30 during shipment and storage as well prevent the removal of the container cap 321 from the container 20 by unauthorized persons. Accordingly, container cap 321 and the container 20 inhibit the refilling cf the container 20 with liquid concentrate 30 thereby insuring the quality of the concentrate 30 internal the container 20. The container cap 321, the saucer shaped resilient disk 341 of the input one-way valve means 340 as well as the body member 370 and the output one-way valve means 340 as illustrate in the relative positions of assembly An overcap 410 removably engages with the container cap 321 for covering the pumping and mixing device 350 to prevent contamination during shipment and storage. The overcap 410 is secured to the container cap 321 in a snap locking engagement as will be described in greater detail with reference to FIG. 28 As shown in FIGS. 26 and 27, the overcap 410 includes a boss 412 extending from the inside of the overcap 410 for sealing with the terminal orifice 336 when the overcap 410 engages with the container cap 321. The seal between the boss 412 and the terminal orifice 336 prevents any leakage of the concentrate 30 during shipment and storage of the completed and filled assembly.

Preferably, the gasket 400, the container cap 321, the saucer shaped resilient disk 341, the body member 370 and the output one-way valve means 340 as well as the overcap 410 are assembled to form a subassembly 420. After the container 20 is filled with the liquid concentrate 30, the subassembly 420 is seal to the container 20 when the container cap 321 is sealed to the container 20.

Figure 28:
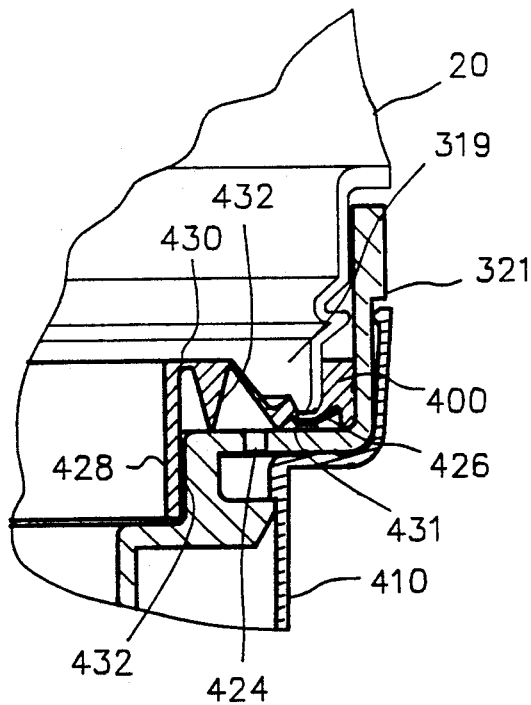
FIG. 28 is an enlarged sectional view of a portion of FIG. 25.

FIG. 28 is an enlarged sectional view of a portion of FIG. 25 further illustrating the seal created between the container cap 321 and the container 20. The overcap 410 includes a projection 421 for interlocking with a shoulder 422 of the container cap 321 for securing the overcap 410 to the container cap 321 in a snap locking engagement. The overcap 410 is secured to the container cap 321 outboard of a vent hole 424 to further prevent any leakage of the concentrate 30 during shipment and storage of the completed and filled assembly.

The resilient gasket 400 includes a sealing portion 426 for effecting a seal between the opening 319 in the container 20 and a first internal surface 431 of the container cap 321. The resilient gasket 400 also includes an integral annular wall portion 428 which is affixed to the sealing portion 426 by a web 430 and extends parallel to a second internal surface 432 of the container cap 321. The resilient gasket 400 includes a vent valve 434 which is interposed between the sealing portion 426 and the annular wall portion 428.

The container cap 321 includes a vent hole 424 for venting the container 20 as the concentrate 30 internal the container 20 is depleted during use of the pumping and mixing device 350. The vent hole 424 is located radially inward of the sealing portion 426 and radially outward of the vent valve 434 of the sealing gasket 400.

As the concentrate 30 internal the container 20 is depleted during use, the pressure internal the container 20 is reduced relative to the ambient pressure at the vent hole 424. As the differential in pressure increases, the vent valve 434 opens permitting the flow of air into the container 20 and to form an air pocket inboard of the vent valve 434 and between the annular wall portion 428 and the second internal surface 432 Continued depletion of the concentrate internal the container 20 causes the vent valve 434 to open permitting the flow of additional air into the container 20. If the pressure internal the container 20 is increases relative to the ambient pressure at the vent hole 424 caused by squeezing the container or a temperature imbalance or the like, the liquid concentrate internal the container will replace the volume of air in the air pocket prior to leaking from the vent hole 424. Accordingly, the air pocket created between the second internal surface 432 and the vent valve 434 inhibits the liquid concentrate 30 internal the container 20 from migrating or leaking from the vent hole 424.

In the dispensing machines of the prior art, 4.0 parts of liquid diluent were required for 1.0 part of liquid concentrate. The pumping and mixing device of the present invention has accurately and reliably pumped a liquid concentrate requiring 4.5 parts of diluent for 1.0 part of liquid concentrate. Although the pumping and mixing device of the present invention is capable of accurately and reliably pumping a liquid concentrate requiring 5.0 parts of diluent for 1.0 part of liquid concentrate, it has been found that the viscosity of the 5.0 liquid concentrate inhibits the normal migration of air bubbles therethrough thus inhibiting the venting of the container.

The dispensing device of the present invention provide a system which substantially advances the liquid dispensing art. The present invention reduces the number of parts required for a liquid dispensing machine of the type herein set forth. The improved pump and mixing device is inexpensive enabling the pumping and mixing device to be shipped with the container of the liquid concentrate and to be discarded after the liquid concentrate within the container has been depleted. Furthermore, the improved pumping and mixing device accurately and reliably pumps liquid concentrate irrespective of the viscosity of the liquid concentrate. The pumping and mixing device is coupled with mechanical motive as well as being fluidly coupled to the liquid diluent concurrently with the insertion of the container within a refrigerated compartment of the dispensing device The concentrate container and the pumping and mixing device are sealed to prevent contamination and leakage of the concentrate during shipment and storage as well as being adapted to inhibit the refilling of the container with liquid concentrate thereby insuring the quality of the concentrate internal the container.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for pumping a liquid from a container having container aperture means and for mixing the liquid from the container with a liquid diluent, comprising in combination:
   a body member having an input body portion and an output body portion with flexible wall means interconnecting said input body portion and said output body portion;
   said flexible wall means defining a pumping chamber between said input body portion and said output body portion;
   said input body portion having an input aperture communicating with said pumping chamber;
   said output body portion having an output aperture communicating with said pumping chamber;
   mounting means for mounting said input body portion relative to the container for enabling the liquid from the container to flow through the container aperture means into said input aperture of said input body portion;
   input one-way valve means for permitting the flow of liquid only from the container aperture means to said pumping chamber of said body member;
   output one-way valve means for permitting the flow of liquid only from said pumping chamber of said body member to said output aperture of said output body portion;
   motive means for reciprocating said output body portion relative to said input body portion between a first and a second position for causing liquid to flow from the container aperture means through said input one-way valve means into said pumping chamber when said output body portion is moved into said first position and for causing liquid to flow from said pumping chamber through said output one-way valve means when said output body portion is moved into said second position; and
   a mixing port cooperating with said body member for introducing the liquid diluent for mixing with the container liquid.

2. An apparatus as set forth in claim 1, wherein the container aperture means include a plurality of container apertures disposed in a cap of the container.

3. An apparatus as set forth in claim 1, wherein the container aperture means include a plurality of container apertures disposed in a cap of the container; and
said mounting means being integrally formed in said body member for resiliently grasping the cap of the container means.

4. An apparatus as set forth in claim 1, wherein said input body portion and said output body portion are integrally formed with said flexible wall means.

5. An apparatus as set forth in claim 1, wherein said input one way valve means in integrally formed with said body portion.

6. An apparatus as set forth in claim 1, wherein said output one way valve means is integrally formed with said body portion.

7. An apparatus as set forth in claim 1, wherein the container aperture means include a plurality of container apertures disposed in a cap of the container; and
said input one way valve means being secured to the cap of the container.

8. An apparatus as set forth in claim 1, wherein said input one-way valve means cooperates with the container aperture means for permitting the flow of liquid from the container into said pumping chamber upon said motive means reciprocating said output body portion into said first position and for inhibiting the flow of liquid from said pumping chamber to the container upon said motive means reciprocating said output body portion into said second position.

9. An apparatus as set forth in claim 1, wherein said output one-way valve means cooperates with the output aperture for permitting the flow of liquid from said pumping chamber into said output body portion upon said motive means reciprocating said output body portion into said second position and for inhibiting the flow of liquid from said output body portion to said pumping chamber upon said motive means reciprocating output body portion into said first position.

10. An apparatus as set forth in claim 1, wherein said motive means includes a motor driving a reciprocating arm with said reciprocating arm having first coupling means; and
said body member having second coupling means for cooperating with said first coupling means for coupling said reciprocating arm to said body member.

11. An apparatus as set forth in claim 1, wherein said body member is molded from a flexible polymeric material.

12. An apparatus for pumping a liquid from a container having container aperture means and for mixing the liquid from the container with a liquid diluent, comprising in combination:
a body member having an input body portion and an output body portion with flexible wall means interconnecting said input body portion and said output body portion;
said flexible wall means defining a pumping chamber between said input body portion and said output body portion;
said input body portion having an input aperture communicating with said pumping chamber;
said output body portion having an output aperture communicating with said pumping chamber;
mounting means for mounting said input body portion relative to the container for enabling the liquid from the container to flow through the container aperture means into said input aperture of said input body portion;
input one-way valve means for permitting the flow of liquid only from the container aperture means to said pumping chamber of said body member;
output one-way valve means for permitting the flow of liquid only from said pumping chamber of said body member to said output aperture of said output body portion;
motive means for reciprocating said output body portion relative to said input body portion between a first and a second position for causing liquid to flow from the container aperture means through said input one-way valve means into said pumping chamber when said output body portion is moved into said first position and for causing liquid to flow from said pumping chamber through said output one-way valve means when said output body portion is moved into said second position;
a mixing chamber defined in said output body portion of said body member;
said mixing chamber communicating with said output aperture for receiving the container liquid from said pumping chamber; and
a mixing port defined in said body member for introducing a liquid diluent into said mixing chamber for mixing with the container liquid.

13. An apparatus as set forth in claim 12, wherein said mixing chamber reciprocation between said first position and said second position upon reciprocation of said output body portion for facilitating the mixing of the liquid diluent with the container liquid.

14. An apparatus as set forth in claim 13, including a flexible tubing connecting the liquid diluent to said mixing port.

15. An apparatus as set forth in claim 12, including a terminal passage communicating with said mixing chamber with said terminal passage defining a terminal orifice for discharging the container liquid and the liquid diluent therefrom.

16. An apparatus as set forth in claim 15, wherein said terminal passage and said terminal orifice are defined in said output body portion.

17. An apparatus as set forth in claim 16, wherein said mixing chamber is integrally formed with said body member and is interposed between said output aperture of said pumping chamber and said terminal orifice.

18. An apparatus as set forth in claim 17, including an overcap secured to the container for covering said body member and for sealing with said terminal orifice to prevent leakage of the container liquid.

19. An apparatus as set forth in claim 12, wherein said mixing port introduces the liquid diluent into said mixing chamber in a flow direction perpendicular to the flow direction of the container liquid.

20. An apparatus as set forth in claim 12, including a surface disposed in said mixing chamber for interrupting the flow of the container liquid to produce a turbulence of the container liquid and the liquid diluent for facilitating the mixing thereof.

21. An apparatus as set forth in claim 12, including a director for converting the turbulence of the container liquid and the liquid diluent into a substantially laminar flow from said terminal orifice.

22. An apparatus as set forth in claim 12, including liquid diluent flow control means for controlling the flow of the liquid diluent into said mixing chamber; and
control means for simultaneously energizing said liquid diluent flow control means and said motive means for mixing a selected amount of the container liquid with a selected amount of the liquid diluent.

23. An apparatus for pumping a container liquid from a container having container aperture means and for mixing the container liquid with a liquid diluent, comprising in combination:

a body member having an input body portion and an output body portion with flexible wall means interconnecting said input body portion and said output body portion;

said flexible wall means defining a pumping chamber between said input body portion and said output body portion;

said input body portion having an input aperture communicating with said pumping chamber;

said output body portion having an output aperture communicating with said pumping chamber;

mounting means for mounting said input body portion relative to the container for enabling the liquid from the container to flow through the container aperture means into said input aperture of said input body portion;

input one-way valve means for permitting the flow of liquid only from the container aperture means to said pumping chamber of said body member;

output one-way valve means for permitting the flow of liquid only from said pumping chamber of said body member to said output aperture of said output body portion;

motive means for reciprocating said output body portion relative to said input body portion between a first and a second position for causing liquid to flow from the container aperture means through said input one-way valve means into said pumping chamber when said output body portion is moved into said first position and for causing liquid to flow from said pumping chamber through said output one-way valve means when said output body portion is moved into said second position;

a mixing chamber defined in said output body portion of said body chamber;

said mixing chamber communicating with said output aperture for receiving the container liquid from said pumping chamber; and a liquid port defined in said body member for introducing the liquid diluent into said mixing chamber for mixing with the container liquid.

24. An apparatus as set forth in claim 23, wherein said motive means includes a motor driving a reciprocating arm with said reciprocating arm having first coupling means; and said body member having second coupling means for cooperating with said first coupling means for coupling said reciprocating arm to said body member.

25. An apparatus as set forth in claim 23, wherein said mixing chamber reciprocation between said first position and said second position upon reciprocation of said output body portion for facilitating the mixing of the liquid diluent with the container liquid.

26. An apparatus as set forth in claim 23, including a terminal passage communicating with said mixing chamber with said terminal passage defining a terminal orifice for discharging the container liquid and the liquid diluent therefrom; and said mixing chamber being integrally formed with said body member and being interposed between said output aperture of said pumping chamber and said terminal orifice.

27. An apparatus as set forth in claim 23, including flexible tubing means connecting the liquid diluent to said mixing port.

28. An apparatus as set forth in claim 23, wherein said mixing port introduces the liquid diluent into said mixing chamber in a flow direction perpendicular to the flow direction of the container liquid.

29. An apparatus as set forth in claim 23, including a surface disposed in said mixing chamber for interrupting the flow of the container liquid to produce a turbulence of the container liquid and the liquid diluent for facilitating the mixing thereof.

30. An apparatus as set forth in claim 23, including a director for converting the turbulence of the container liquid and the liquid diluent into a substantially laminar flow from said terminal orifice.

31. An apparatus as set forth in claim 23, wherein the container aperture means is defined in a container cap securable to the container; and said container cap having vent means for venting the container during depletion of the container liquid from the container.

32. An apparatus as set forth in claim 23, wherein the container aperture means is defined in a container cap securable to the container;

said container cap having vent means for venting the container during depletion of the container liquid from the container; and an overcap securable to said container for sealing said vent means during storage and shipment.

33. An apparatus as set forth in claim 23, wherein the container aperture means is defined in a container cap securable to the container;

said container cap having vent means for venting the container during depletion of the container liquid from the container;

a gasket interposed between said container and said container cap for providing a sealing engagement therebetween;

said gasket establishing an annular wall disposed between said vent means and an interior volume of said container for creating a volume of air outboard of said annular wall for permitting air external said container to enter said interior volume of said container and for preventing the migration of liquid in said interior volume from said vent means.

* * * * *